United States Patent
Uesugi

(10) Patent No.: US 6,999,497 B2
(45) Date of Patent: Feb. 14, 2006

(54) DATA TRANSMITTING APPARATUS AND DATA TRANSMITTING METHOD

(75) Inventor: Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 868 days.

(21) Appl. No.: 09/959,607

(22) PCT Filed: Mar. 12, 2001

(86) PCT No.: PCT/JP01/01898

§ 371 (c)(1),
(2), (4) Date: Oct. 31, 2001

(87) PCT Pub. No.: WO01/69828

PCT Pub. Date: Sep. 20, 2001

(65) Prior Publication Data

US 2002/0159502 A1    Oct. 31, 2002

(30) Foreign Application Priority Data

Mar. 15, 2000    (JP)    ............................. 2000-072715

(51) Int. Cl.
*H04B 1/69*    (2006.01)
*H04B 1/38*    (2006.01)
*H04L 27/00*    (2006.01)

(52) U.S. Cl. ........................ 375/130; 375/219; 375/295

(58) Field of Classification Search ................ 375/295, 375/130, 146, 147, 144, 150, 219; 370/342, 370/344, 203, 210; 342/378, 383; 714/751, 714/795

See application file for complete search history.

(56) References Cited

U.S. PATENT DOCUMENTS

| | | | | |
|---|---|---|---|---|
| 5,504,775 A | * | 4/1996 | Chouly et al. | ............... 370/210 |
| 6,064,338 A | * | 5/2000 | Kobayakawa et al. | ...... 342/378 |
| 6,138,260 A | * | 10/2000 | Ketseoglou | ................. 714/751 |
| 6,145,108 A | * | 11/2000 | Ketseoglou | ................. 714/751 |
| 6,175,551 B1 | * | 1/2001 | Awater et al. | ............... 370/210 |

FOREIGN PATENT DOCUMENTS

| | | |
|---|---|---|
| EP | 0610988 | 8/1994 |
| EP | 1011245 | 6/2000 |

(Continued)

OTHER PUBLICATIONS

International Search Report dated Jun. 19, 2001.
Chinese Office Action dated Apr. 29, 2005 with English translation.

*Primary Examiner*—Khai Tran
(74) *Attorney, Agent, or Firm*—Stevens, Davis, Miller & Mosher, LLP

(57) ABSTRACT

A spreader 112 of a base station apparatus 100 spreads transmission data at a low spreading factor at which a given signal quality can be little obtained after despreading at a mobile station apparatus 101, when an error detector 137 of the mobile station apparatus 101 detects an error in despread data of received data, a data retransmission request is performed to the base station apparatus 100 and despread data is held by a despreader/combiner 136. After that, the mobile station apparatus 101 repeats processing for combining the held data with the retransmitted data subjected to despreading until the time when an error-undetected state comes. This makes it possible to increase transmission efficiency, suppress transmission power extremely, and improve diversity performance to transmit data from a plurality of antennas.

18 Claims, 15 Drawing Sheets

FOREIGN PATENT DOCUMENTS

| | | |
|---|---|---|
| JP | 58081356 | 5/1983 |
| JP | 61222335 | 10/1986 |
| JP | 63028146 | 2/1988 |
| JP | 01300732 | 12/1989 |
| JP | 06318926 | 11/1994 |
| JP | 11136212 | 5/1999 |
| JP | 11252056 | 9/1999 |
| JP | 11274976 | 10/1999 |
| JP | 11275054 | 10/1999 |
| JP | 200031944 | 1/2000 |
| JP | 2000004196 | 1/2000 |
| WO | 9522210 | 8/1995 |

* cited by examiner

DATA TRANSMITTING APPARATUS AND DATA TRANSMITTING METHOD

TECHNICAL FIELD

The present invention relates to a data transmitting apparatus and a data transmitting method which are applied to a cellular phone a mobile station apparatus such as an information terminal apparatus having a cellular phone function and a computer function, and a base station that performs radio communication with the mobile station apparatus in a mobile communication system to which CDMA (Code Division Multiple Access) is applied.

BACKGROUND ART

Conventionally, this kind of data transmitting apparatus and data transmitting method are described in, for example, Japanese Patent No. 1647396. FIG. 1 is a block diagram illustrating the configuration of each of a base station apparatus and a mobile station apparatus, which are used as conventional data transmitting apparatuses.

The base station apparatus 1 illustrated in FIG. 1 includes a buffer 10, a format converter 11, a spreader 12, a modulator 13, a variable gain amplifier 14, a demodulator 15, a despreader 16, an error detector 17, and an SIR detector 18.

An output signal of the variable gain amplifier 14 is transmitted from an antenna via a circulator 19. Moreover, the signal received by the antenna is outputted to the demodulator 15 via the circulator 19.

Moreover, the mobile station apparatus 2 illustrated in FIG. 1 includes a buffer 30, a format converter 31, a spreader 32, a modulator 33, a variable gain amplifier 34, a demodulator 35, a despreader 36, an error detector 37, and an SIR detector 38.

An output signal of the variable gain amplifier 34 is transmitted from an antenna via a circulator 39. Moreover, the signal received by the antenna is outputted to the demodulator 35 via the circulator 39.

According to the above configuration, when data is transmitted from the base station apparatus 1 to the transmitting station apparatus 2, data is subjected to buffering by the buffer 10 and the resultant data is formatted to a given format by the format converter 11 and the resultant data is spread by the spreader 12. A spreading factor used at the spreader 12 is determined when a channel is assigned, and the determined spreading factor is fixed afterward.

Spread data is modulated by the modulator 13, and modulated data is further amplified by the variable gain amplifier 14 and is transmitted from the antenna via the circulator 19.

This transmission signal is received by the antenna of mobile station apparatus 2 and is inputted to the modulator 35 via the circulator 39. Then, after the inputted signal is demodulated by the modulator 35, the modulated signal is despread by the despreader 36. This obtains received data.

At the time of this reception, the SIR detector 38 outputs a TPC command (Transmission Power Control signal) that makes a request of the transmitting side to increase/decrease a level in accordance with the received level.

Moreover, when detecting an error from an error detection bit of received data, the error detector 37 outputs a retransmission request signal.

The TPC command and retransmission request signal are transmitted to the base station apparatus 1 via the format converter 31.

When a request for an increase/decrease in a level with the TPC is made, the despreader 16 of the base station apparatus 1 varies the gain of variable gain amplifier 14 as required in accordance with the request.

Moreover, when retransmission is performed, the base station apparatus 1, which has received the retransmission request signal, retransmits transmission data.

Such control is provided to the base station apparatus 1 from the mobile station apparatus 2 in the similar way.

Thus, according to the conventional data transmission method, the spreading factor is fixed to perform data transmission. Namely, though the retransmission request is made, the conventional data transmission method uses such a spreading factor that is held constant to obtain reception performance at one time. For this reason, high-speed transmission power control is performed to maintain the quality.

However, in the conventional apparatus, its performance is largely influenced by the accuracy of transmission power control because CDMA system is used. Particularly, delay in control at a high-speed fading time causes a crucial problem. Namely, unless transmission power control is executed with high accuracy according to the TPC command, a desired quality cannot be maintained. Moreover, the apparatus does not keep up with high-speed fading in some cases. This causes a problem in which transmission efficiency decreases.

Since the fading variation speed becomes fast as the use frequency band increases in the mobile communication system, quality deterioration will increase extra in the future relative to the current state. Also, since TPC command must be frequently transmitted, its processing time increases and transmission efficiency is expected to further deteriorate.

Regarding the fixed spreading factor, on the assumption of the line whose condition is poor to some extent, the spreading factor must be fixed to be high to some extent. This causes a problem in which a symbol rate cannot be increased so that high-speed transmission cannot be performed, resulting in deterioration of transmission efficiency.

Moreover, if transmission power control is performed to maintain the average quality, the user having a poor line quality needs a large amount of transmission power and the transmission amplifier must deal with a large dynamic range. Furthermore, in the case of a good line condition, though transmission power can be dropped, average transmission power is lost. For example, in the case where the possibility that data transmission will be performed with the half power of standard power is equal to the possibility that data transmission will be performed with the double power of standard power, there is a problem in which large average transmission power is always needed as compared with transmission with standard transmission power. Furthermore, there is another problem in which the dynamic range of an interference signal is increased by transmission power control so that the large dynamic range of the demodulation system is required.

Moreover, the spreading factor can be adaptively changed, but the spreading factor must be transmitted to the communication counterpart for this purpose. It is difficult to estimate an optimal spreading factor to perform this transmission. Even if such estimation can be carried out, this prevents high-speed communication when delay time for estimation increases. Furthermore, in the case where information for estimation is transmitted, the entire amount of signals increases. This causes a problem in which transmission efficiency deteriorates.

Moreover, at the present time, transmission from a plurality of antennas is also carried out in W-CDMA. However, even if transmission from a plurality of antennas is thus carried out, there is a problem in which performance as transmission diversity is not so largely improved.

DISCLOSURE OF INVENTION

It is an object of the present invention to provide a data transmitting apparatus and data transmitting method that are capable of improving transmission efficiency, suppressing transmission power extremely, and improving diversity performance at the time of transmission from a plurality of antennas.

With attention focused on the fact that despread data can be combined and received data can be extracted if the result of combination reaches a desired quality, transmission is performed at a low spreading factor, retransmission is repeated until data is OK, data is combined for each retransmission to improve quality so that transmission is resultantly performed at an optimal spreading factor, whereby the above object is attained.

BEST MODE FOR CARRYING OUT THE INVENTION

The following will explain embodiments of the present invention with reference to the drawings accompanying herewith.

(Embodiment 1)

Figure 1:
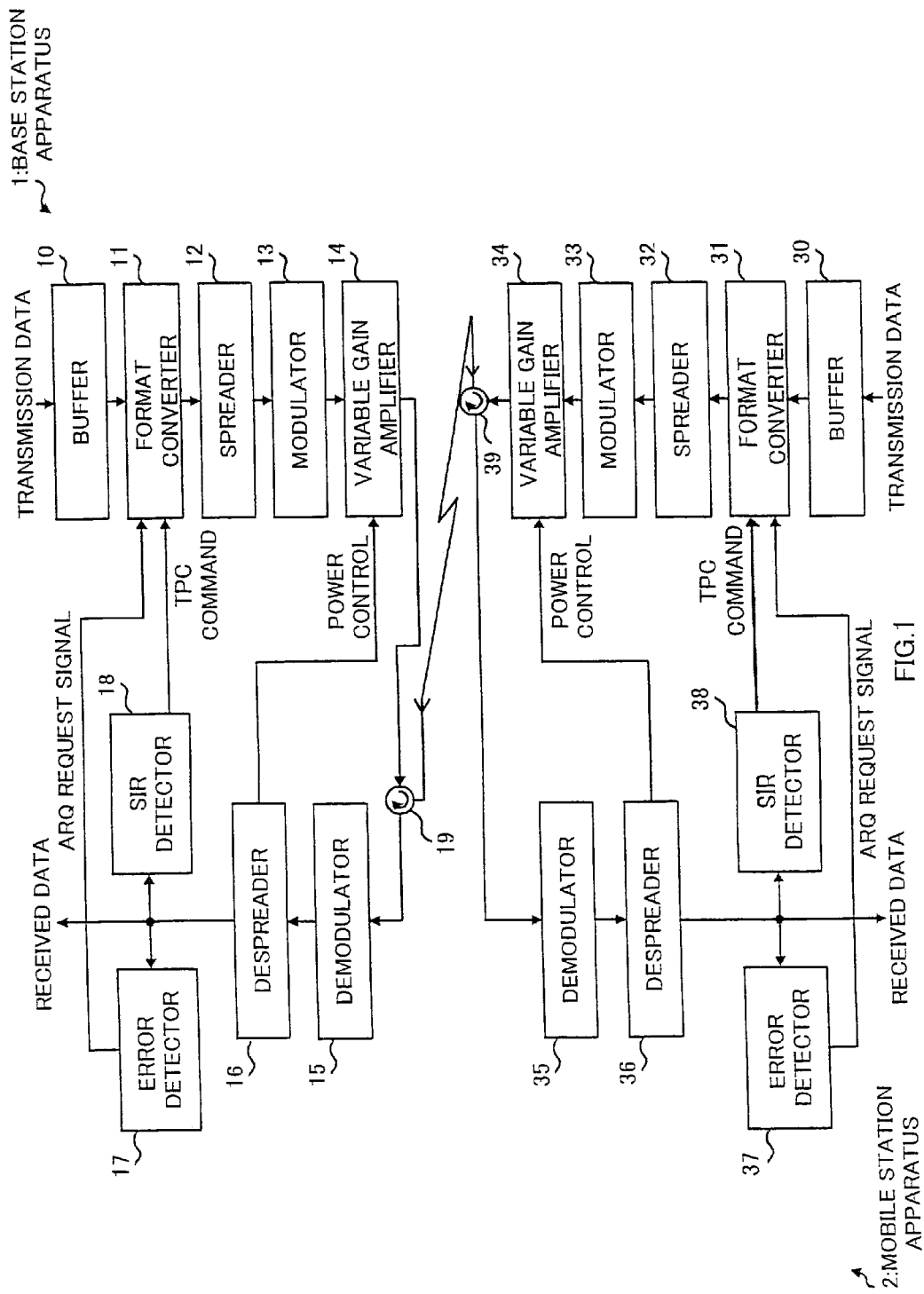
FIG. 1 is a block diagram illustrating the configuration of each of a base station apparatus and a mobile station apparatus, which are conventional data transmitting apparatuses.
Figure 2:
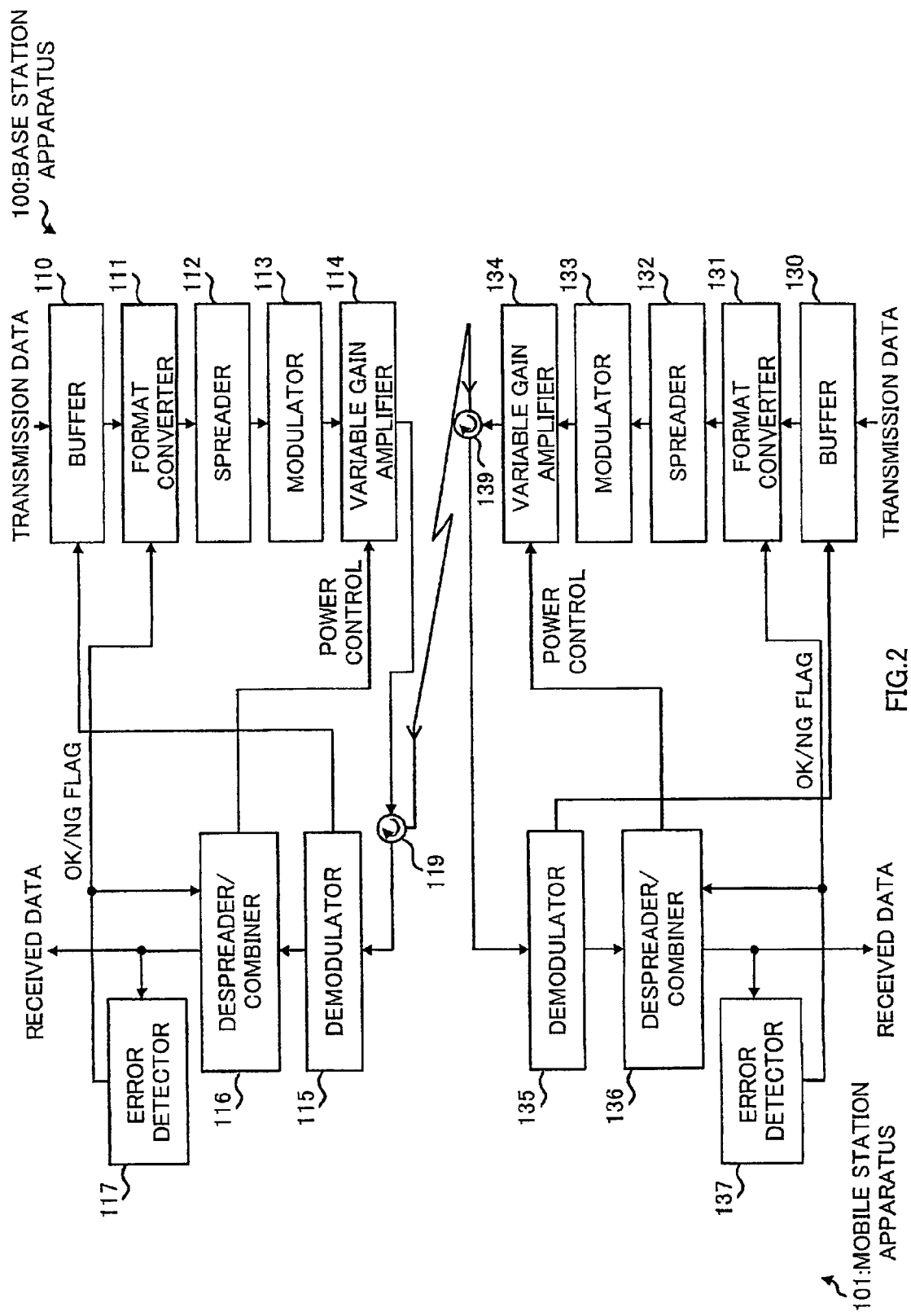
FIG. 2 is a block diagram illustrating the configuration of each of a base station apparatus and a mobile station apparatus, which are data transmitting apparatuses according to Embodiment 1 of the present invention.

FIG. 2 is a block diagram illustrating the configuration of each of a base station apparatus and a mobile station apparatus, which are data transmitting apparatuses according to Embodiment 1 of the present invention.

A base station apparatus 100 illustrated in FIG. 2 includes a buffer 110, a format converter 111, a spreader 112, a modulator 113, a variable gain amplifier 114, a demodulator 115, a despreader/combiner 116, and an error detector 117.

An output signal of the variable gain amplifier 114 is transmitted from an antenna via a circulator 119. Moreover, the signal received by the antenna is outputted to the demodulator 115 via the circulator 119.

Moreover, a mobile station apparatus 101 illustrated in FIG. 2 includes a buffer 130, a format converter 131, a spreader 132, a modulator 133, a variable gain amplifier 134, a demodulator 135, a despreader/combiner 136, and an error detector 137.

An output signal of the variable gain amplifier 134 is transmitted from an antenna via a circulator 139. Moreover, the signal received by the antenna is outputted to the demodulator 135 via the circulator 139.

The feature of Embodiment 1 lies in the spreader 112 (or 132), the despreader/combiner 116 (or 136), and the error detector 117 (or 137).

The spreader 112 spreads transmission data at a spreading factor (hereinafter referred to as "low spreading factor"), which is so low that a given signal quality cannot be obtained after despreading at the receiving side except when the channel condition is extremely high.

The despreader/combiner 116 repeats such processing that provides despreading to the received signal after demodulation, and holds the received signal subjected to despreading, combines with next received data, outputs the combined resultant to the error detector 117, and combines the combined data with next received data. Then, when an OK flag is inputted from the error detector 117, the despreader/combiner 116 resets held data, and repeats the above-mentioned processing again.

When detecting an error from error detection bits of received data sent from the despreader/combiner 116, the error detector 117 outputs a NG flag, which performs a retransmission request to the transmitting side, to the format converter 111, and outputs an OK flag thereto when such an error is undetected.

In such the configuration, when transmission data is transmitted to the mobile station apparatus 101 from the base station apparatus 100, data is subjected to buffering by the buffer 110 and the resultant data is formatted to a given format by the format converter 111 and the formatted data is spread by the spreader 112.

Spread data is modulated by the modulator 113, and modulated data is further amplified by the variable gain amplifier 114 and the amplified resultant is transmitted from the antenna via the circulator 119.

This transmission signal is received by the antenna of mobile station apparatus 101 and is inputted to the demodulator 135 via the circulator 139. Then, after the inputted signal is demodulated by the demodulator 135, the demodulated signal is subjected to despreading by the despreader/combiner 136, so that despread data is held.

At the time of this reception, when the error detector 137 detects an error from error detection bits of received data, it outputs a NG flag to send a retransmission request to the base station apparatus 100.

The base station apparatus 100, which has received the retransmission request, instructs the demodulator 115 to retransmit data stored in the buffer 110.

Moreover, the despreader/combiner 136 to which the NG flag has been inputted combines data received this time with previous held data.

When no error is detected from the received data combined, the OK flag is outputted from the error detector 137 to the format converter 131 and despreader/combiner 136. This obtains received data, and transmits the OK flag to the base station apparatus 100 so that data currently being held is reset by the despreader/combiner 136. Moreover, data currently being held is reset by the buffer 110.

Figure 3A:
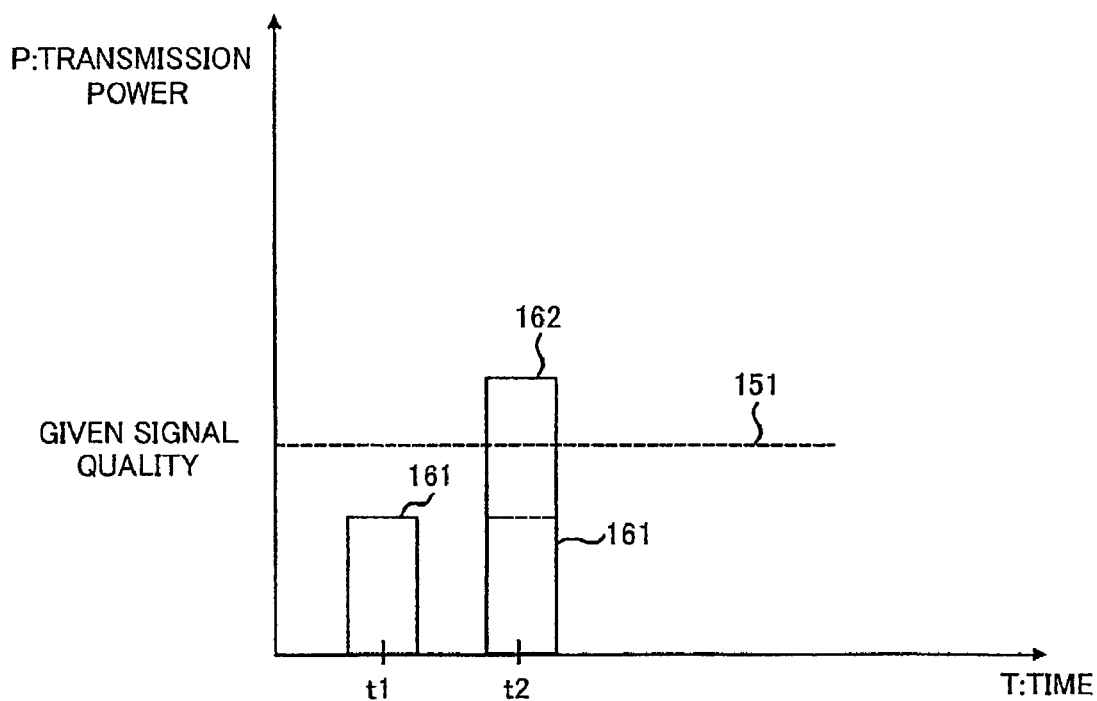
FIG. 3A is a view illustrating that a signal quality is gradually improved at the time of a good channel condition.
Figure 3B:
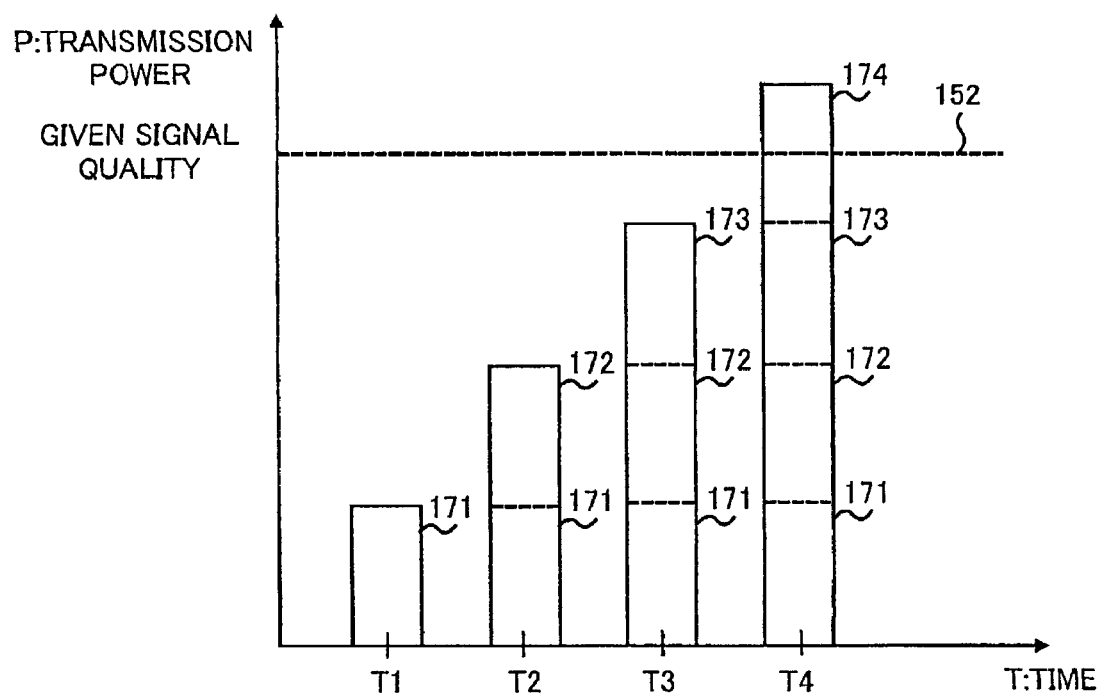
FIG. 3B is a view illustrating that a signal quality is gradually improved at the time of a poor channel condition.

FIG. 3A is a view illustrating that a signal quality is gradually improved by combing data for each retransmission at the time of a good channel condition. FIG. 3B is a view illustrating that a signal quality is gradually improved by combing data for each retransmission at the time of a poor channel condition. A vertical axis (P) represents transmission power and a horizontal axis (T) represents time.

Moreover, a broken line 151 indicates a transmission power quantity necessary to ensure a given signal quality at the time of a good channel condition. A broken line 152 indicates a transmission power quantity necessary to ensure a given signal quality at the time of a poor channel condition. The broken line 151 indicates a value that is lower than the broken line 152. This means that the good channel condition may use small amounts of transmission power as compared with the poor channel condition.

Data 161 transmitted to the mobile station apparatus 101 from the base station apparatus 100 is despread by the despreader/combiner 136 at t1, and despread data is held. At this time, if transmission power from the base station apparatus 100 is so low that a given communication quality cannot be ensured at the mobile station apparatus 101, the error detector 137 detects an error and sends a retransmission request to the base station apparatus 100.

The base station apparatus 100, which has received the retransmission request, retransmits the same data 162 as data 161 to the mobile station apparatus 101 at t2. The despreader/combiner 136 combines data 162, which has been received by the mobile station apparatus 101, with data 161 already held. When no error is detected from this combined received data, an OK flag is sent to the base station apparatus 100.

Similarly, in FIG. 3B, data 171 is transmitted at T1, data 172 is transmitted at T2, and data 171 and data 172 are combined with each other. However, this cannot ensure a given signal quality, so that an error is detected by the error detector 137. For this reason, data 173 is combined with data 171 and 172 at T3, and data 174 is combined with the resultant data at T4, so that the given signal quality can be ensured.

As illustrated in FIG. 3A, when the channel condition is good, the amount of transmission power for ensuring the given communication quality may be small, so that the number of retransmission times is also small (the number of retransmission times is one in the case of 3A).

However, as illustrated in FIG. 3B, when the channel condition is poor, the amount of transmission power for ensuring the given communication quality may be large, so that the number of retransmission times is also large (the number of retransmission times is three in the case of 3B).

Thus, according to the data transmitting apparatus of Embodiment 1, transmission is performed at a low spreading factor, retransmission is repeated until data is OK, and the resultant is combined for each retransmission to improve the quality. Resultantly, this makes it possible to perform transmission at an optimal spreading factor. This causes no delay in reflection of the optimal rate, and eliminates the need for sending notification of rate.

In other words, unlike the prior art, it is unnecessary to fix a relatively large spreading factor on the assumption that the channel condition is poor to some extent at the fixed spreading factor. Accordingly, a symbol rate can be increased to make it possible to improve transmission efficiency.

Moreover, since it is unnecessary to perform transmission power control to frequently transmit the TPC command for holding the average quality, transmission efficiency can be improved due to no performance of such transmission power control accordingly.

Still moreover, unlike the prior art, it is unnecessary to perform transmission power control to hold the average quality. This eliminates the need for providing a large dynamic range of demodulation system, making it possible to suppress transmission power.

(Embodiment 2)

Figure 4:
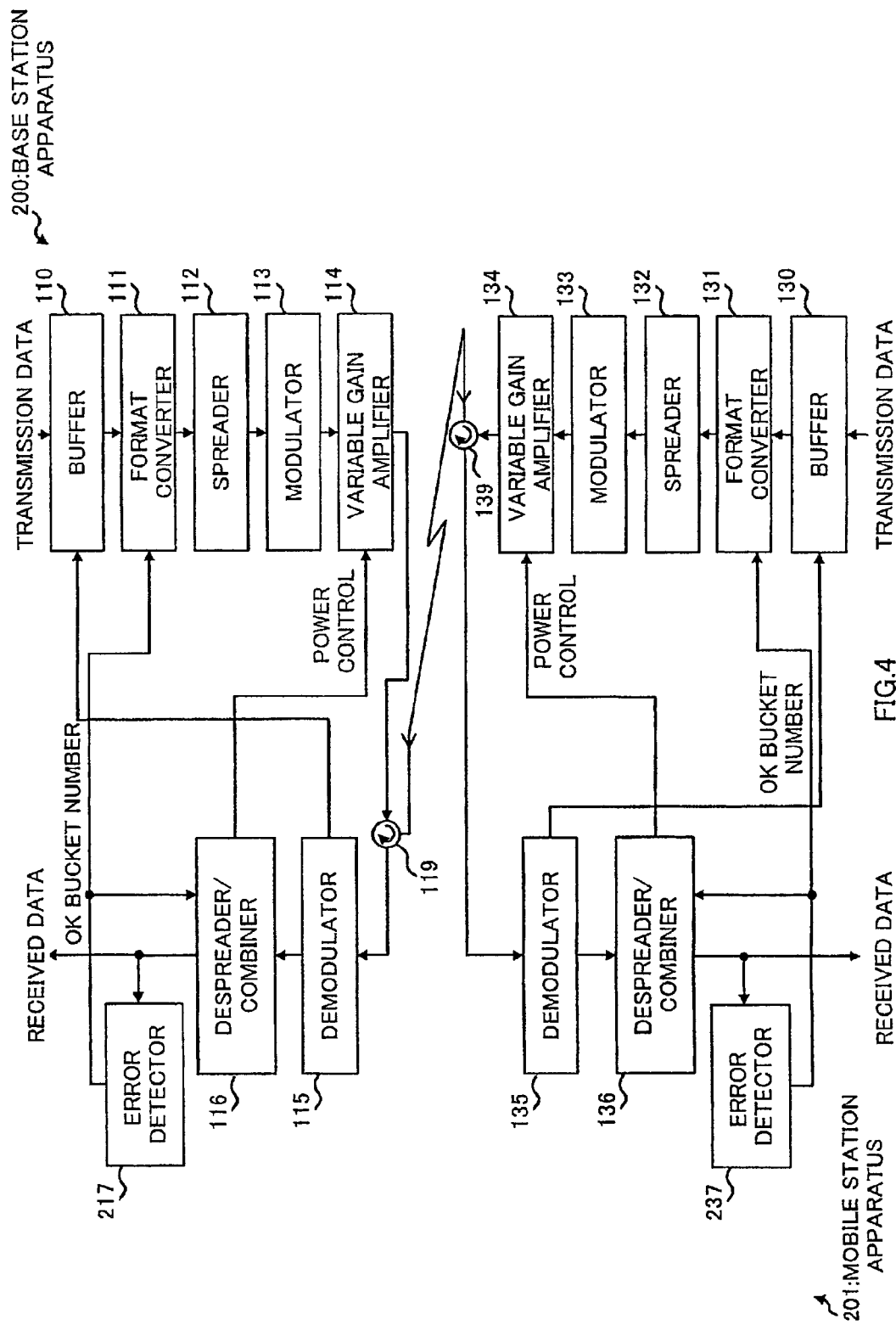
FIG. 4 is a block diagram illustrating the configuration of each of a base station apparatus and a mobile station apparatus, which are data transmitting apparatuses according to Embodiment 2 of the present invention.

FIG. 4 is a block diagram illustrating the configuration of each of a base station apparatus and a mobile station apparatus, which are data transmitting apparatuses according to Embodiment 2 of the present invention. In FIG. 4, the same reference numerals as FIG. 2 are added to the portions common to FIG. 2 and the explanation is omitted.

The difference between FIG. 4 and FIG. 2 lies in an error detector 217 of a base station apparatus 200 and an error detector 237 of a mobile station apparatus 201.

Only when received data sent from the despreader/combiner 116 (or 136) is appropriately received, the error detector 217 (or 237) transmits a number (OK packet number) of data appropriately received to the transmitting side.

Thus, according to the data transmitting apparatus of Embodiment 2, only when received data is appropriately received, the OK packet number is transmitted to the transmitting side. This eliminates the need for transmitting a retransmission request signal uselessly when the number of retransmission times is small.

(Embodiment 3)

Figure 5:
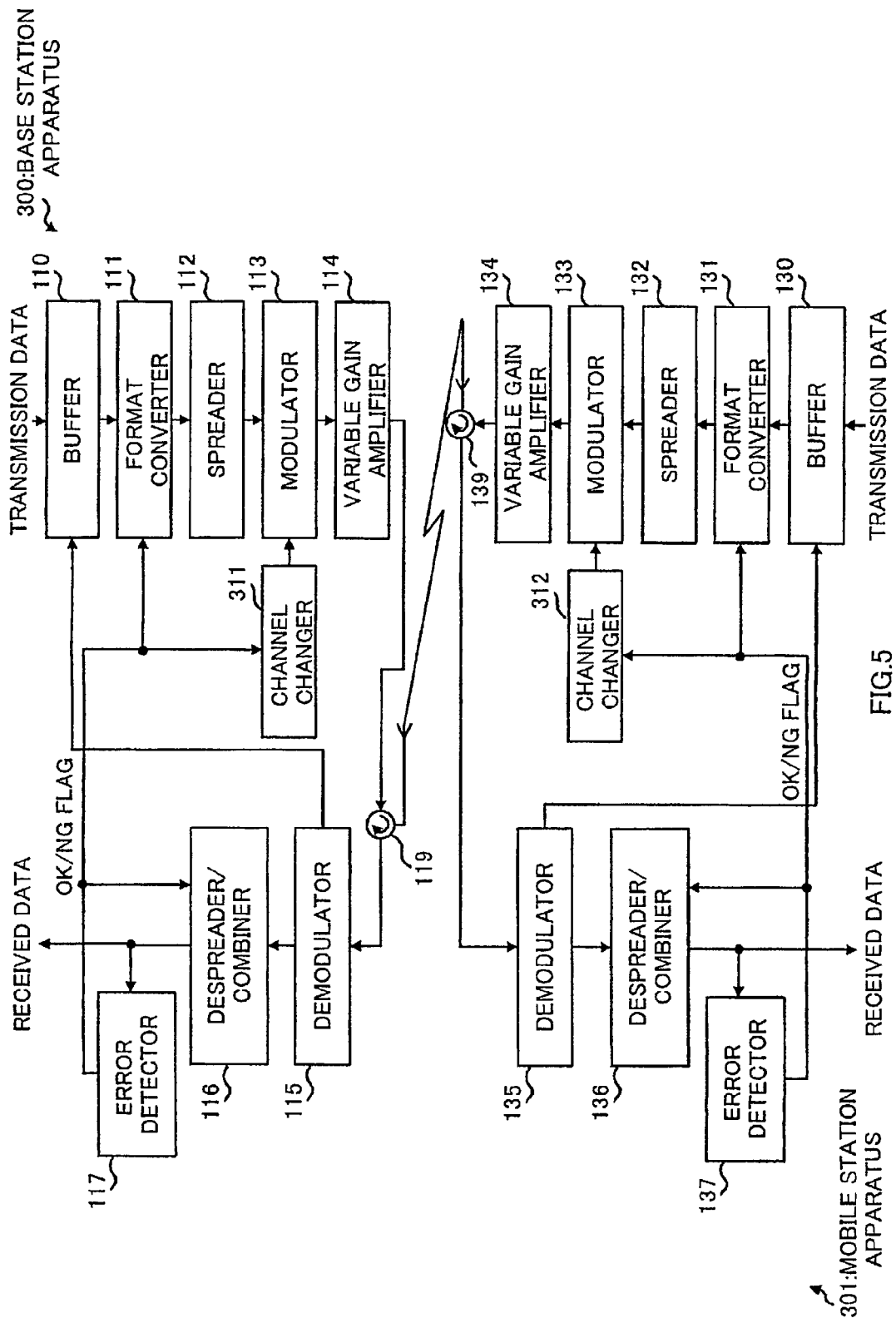
FIG. 5 is a block diagram illustrating the configuration of each of a base station apparatus and a mobile station apparatus, which are data transmitting apparatuses according to Embodiment 3 of the present invention.

FIG. 5 is a block diagram illustrating the configuration of each of a base station apparatus and a mobile station apparatus, which are data transmitting apparatuses according to Embodiment 3 of the present invention. In FIG. 5, the same reference numerals as FIG. 2 are added to the portions common to FIG. 2 and the explanation is omitted.

The difference between FIG. 5 and FIG. 2 lies in the point that a channel changer 311 and a channel changer 312 are added to a base station apparatus 300 and a mobile station apparatus 301, respectively.

The channel changer 311 (or 312) is connected between the error detector 117 (or 137) and the modulator 113 (or 133) to provide an instruction to change a channel (for example, frequency), which is a medium for transmitting a signal at the time of retransmission using the NG flag.

Thus, according to the data transmitting apparatus of Embodiment 3, since the channel, which is the medium for transmitting a signal, is changed at the time of retransmission, diversity effect can be obtained to make it possible to prevent the line from entering the low quality state for a long time at the time of low-speed fading. This change in channel may be periodically executed instead of execution for each retransmission.

(Embodiment 4)

Figure 6:
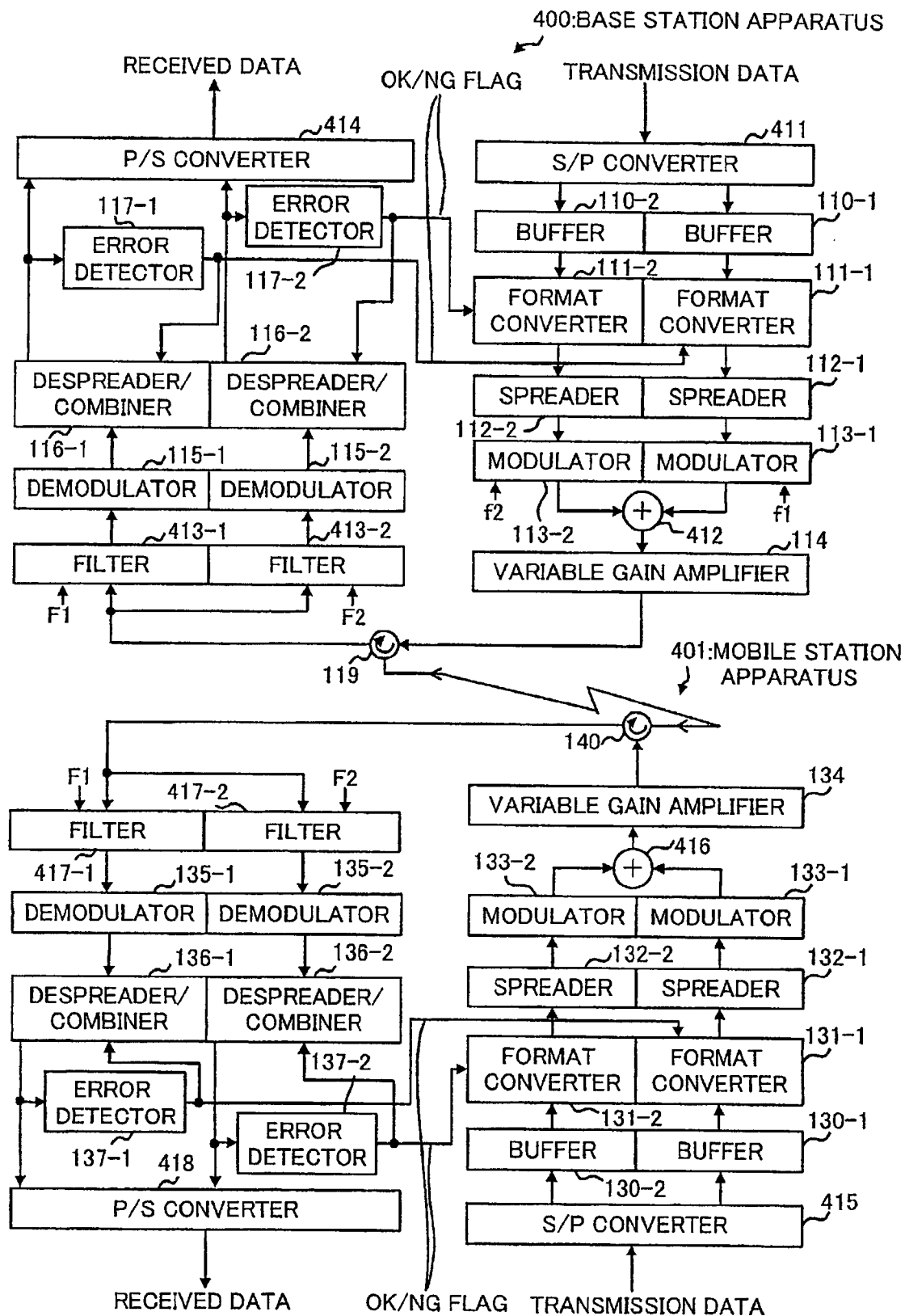
FIG. 6 is a block diagram illustrating the configuration of each of a base station apparatus and a mobile station apparatus, which are data transmitting apparatuses according to Embodiment 4 of the present invention.

FIG. 6 is a block diagram illustrating the configuration of each of a base station apparatus and a mobile station apparatus, which are data transmitting apparatuses according to Embodiment 4 of the present invention. In FIG. 6, the same reference numerals as FIG. 2 are added to the portions common to FIG. 2 and the explanation is omitted.

The difference between FIG. 6 and FIG. 2 lies in the point that each of a base station apparatus 400 and a mobile station apparatus 401 are provided with a multi-carrier transmission/reception configuration. In this example, it is assumed that frequencies f1, f2, and F1, F2 are used.

Namely, as illustrated in FIG. 6, two lines each including the configuration components illustrated in FIG. 2 are provided and a base station apparatus 400 includes a S/P (Serial/Parallel) converter 411 that parallel-converts transmission data and outputs the resultant to each of buffers 110-1 and 110-2, and a mixer 412 that mixes output signals sent from each of modulators 113-1 and 113-2 and outputs the resultant to the variable gain amplifier 114.

It also includes filters 413-1 and 413-2 passing only components of frequencies F1 and F2 of the received signal via the circulator 119 to output the resultant to demodulators 115-1 and 115-2, respectively, and a P/S (Parallel/Serial) converter 414 that parallel-converts received data sent from the despreader/combiners 116-1 and 116-2 and outputs the resultant received data.

Moreover, a mobile station apparatus 401 includes a S/P (Serial/Parallel) converter 415 that parallel-converts transmission data and outputs the resultant to buffers 130-1 and 130-2, respectively, and a mixer 416 that mixes output signals sent from each of modulators 133-1 and 133-2 and outputs the resultant to the variable gain amplifier 134.

Still moreover, it also includes filters 417-1 and 417-2 passing only components of frequencies F1 and F2 of the received signal via the circulator 139 to output the resultant to demodulators 135-1 and 135-2, respectively, and a P/S (Parallel/Serial) converter 418 that parallel-converts received data sent from the despreader/combiners 136-1 and 136-2 and outputs the resultant received data.

Thus, according to the data transmitting apparatus of Embodiment 4, the use of multi-carrier transmission makes it possible to increase diversity effect and perform high-rate transmission. This also makes it possible to maintain the average transmission rate constant to some degree (in the case where the large amount of carriers is provided, the number of OK carriers included therein is substantially constant).

Still moreover, it is possible to determine the success or failure in transmission of data for each carrier, and implement fast data rate in the line, which is instantaneously good. Herein, in consideration of packet transmission, it is better that the packet transmission, which was coincidentally good by making a difference in a signal quality, is terminated for a short time relative to the case in which an average error rate is improved.

(Embodiment 5)

Figure 7:
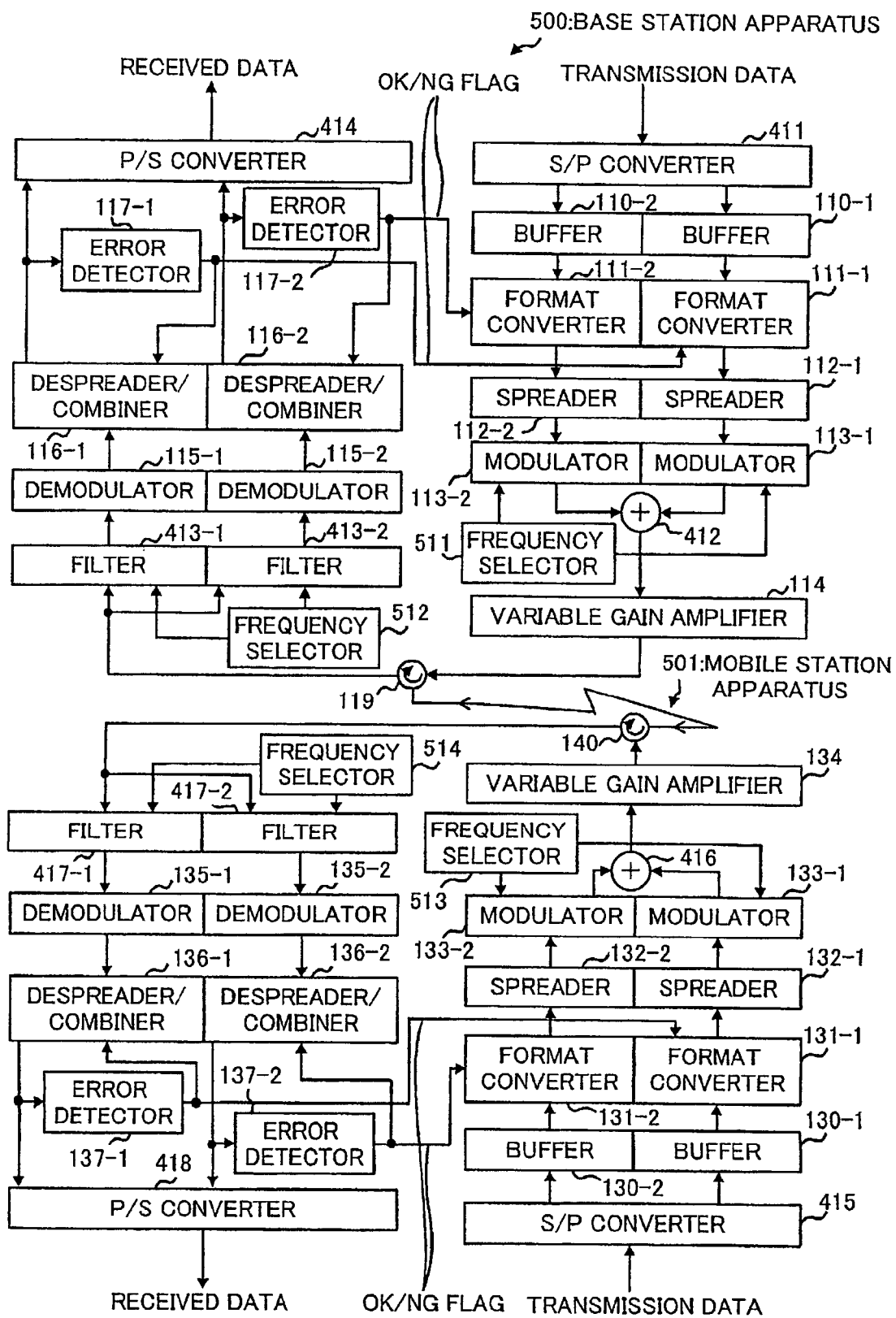
FIG. 7 is a block diagram illustrating the configuration of each of a base station apparatus and a mobile station apparatus, which are data transmitting apparatuses according to Embodiment 5 of the present invention.

FIG. 7 is a block diagram illustrating the configuration of each of a base station apparatus and a mobile station apparatus, which are data transmitting apparatuses according to Embodiment 5 of the present invention. In FIG. 7, the same reference numerals as FIG. 6 are added to the portions common to FIG. 6 and the explanation is omitted.

The difference between FIG. 7 and FIG. 6 lies in the point that frequency selectors 511 to 514, which arbitrarily select multi-carrier frequencies to be set, are provided in a base station apparatus 500 and a mobile station apparatus 501.

In other words, the frequency selectors 511 to 514 arbitrarily select multi-carrier frequencies of transmission/reception data to be set.

Thus, according to the data transmitting apparatus of Embodiment 5, the multi-carrier frequencies of transmission/reception data can be arbitrarily set, making it possible to obtain frequency diversity effect.

(Embodiment 6)

Figure 8:
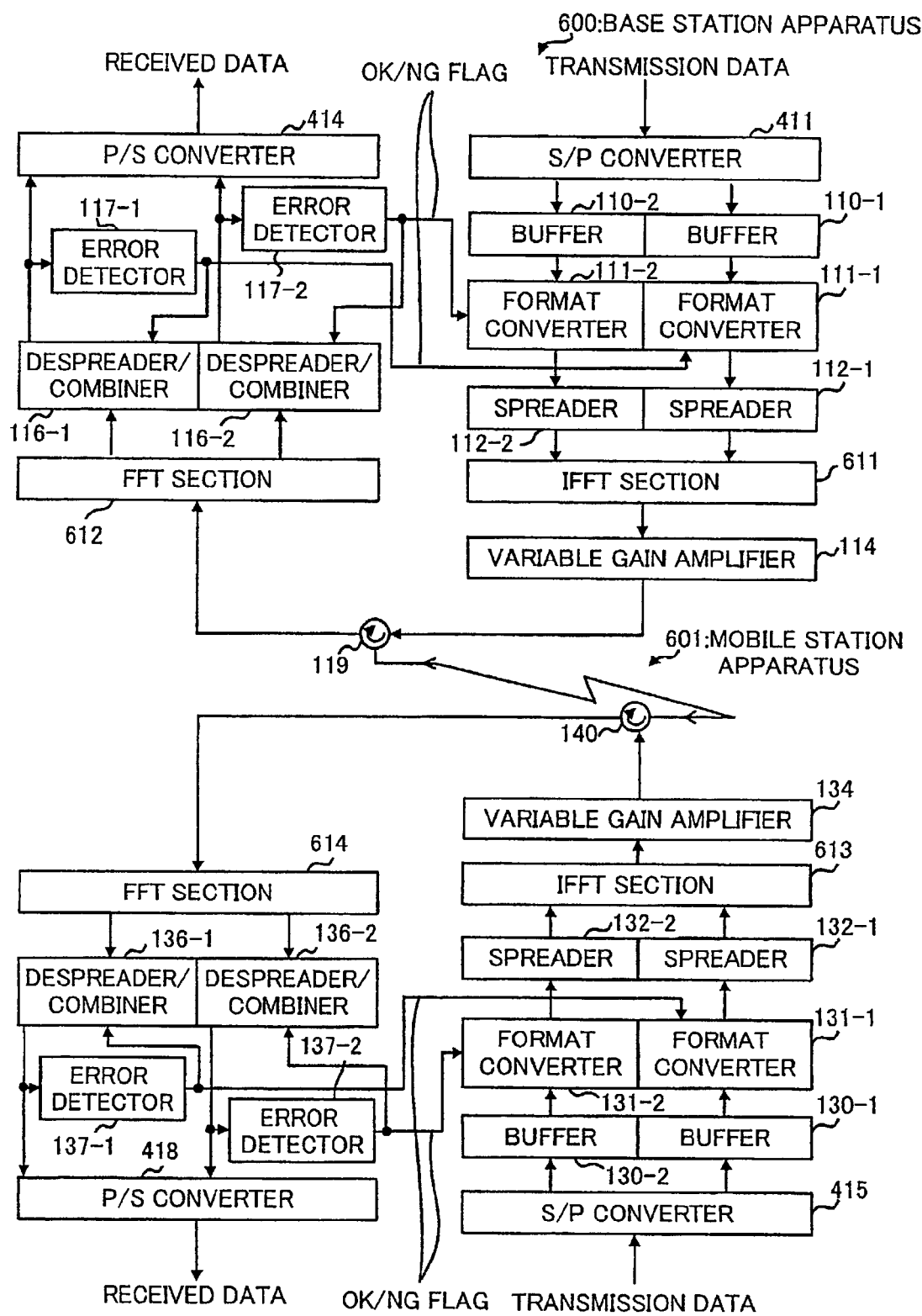
FIG. 8 is a block diagram illustrating the configuration of each of a base station apparatus and a mobile station apparatus, which are data transmitting apparatuses according to Embodiment 6 of the present invention.

FIG. 8 is a block diagram illustrating the configuration of each of a base station apparatus and a mobile station apparatus, which are data transmitting apparatuses according to Embodiment 6 of the present invention. In FIG. 8, the same reference numerals as FIG. 6 are added to the portions common to FIG. 6 and the explanation is omitted.

The difference between FIG. 8 and FIG. 6 lies in the point that IFFT (Inverse Fast Fourier Transform) sections 611, 613, and FFT (Fast Fourier Transform) sections 612, 614 are provided in a base station apparatus 600 and a mobile station apparatus 601 in order to perform OFDM communication.

More specifically, the base station apparatus 600 includes the IFFT section 611, which provides Inverse Fast Fourier Transform to spread data sent from the spreaders 112-1, 112-2 and outputs the resultant to the variable gain amplifier 114, and the FFT section 612, which provides Fast Fourier Transform to the received signal via the circulator 119 and outputs the resultant to the despreader/combiners 116-1 and 116-2.

The mobile station apparatus 601 includes the IFFT section 613, which provides Inverse Fast Fourier Transform to spread data sent from the spreaders 132-1, 132-2 and outputs the resultant to the variable gain amplifier 134, and the FFT section 614, which provides Fast Fourier Transform to the received signal via the circulator 139 and outputs the resultant to the despreader/combiners 136-1 and 136-2.

Thus, according to the data transmitting apparatus of Embodiment 6, frequency efficiency can be improved by performing OFDM communication.

(Embodiment 7)

Figure 9:
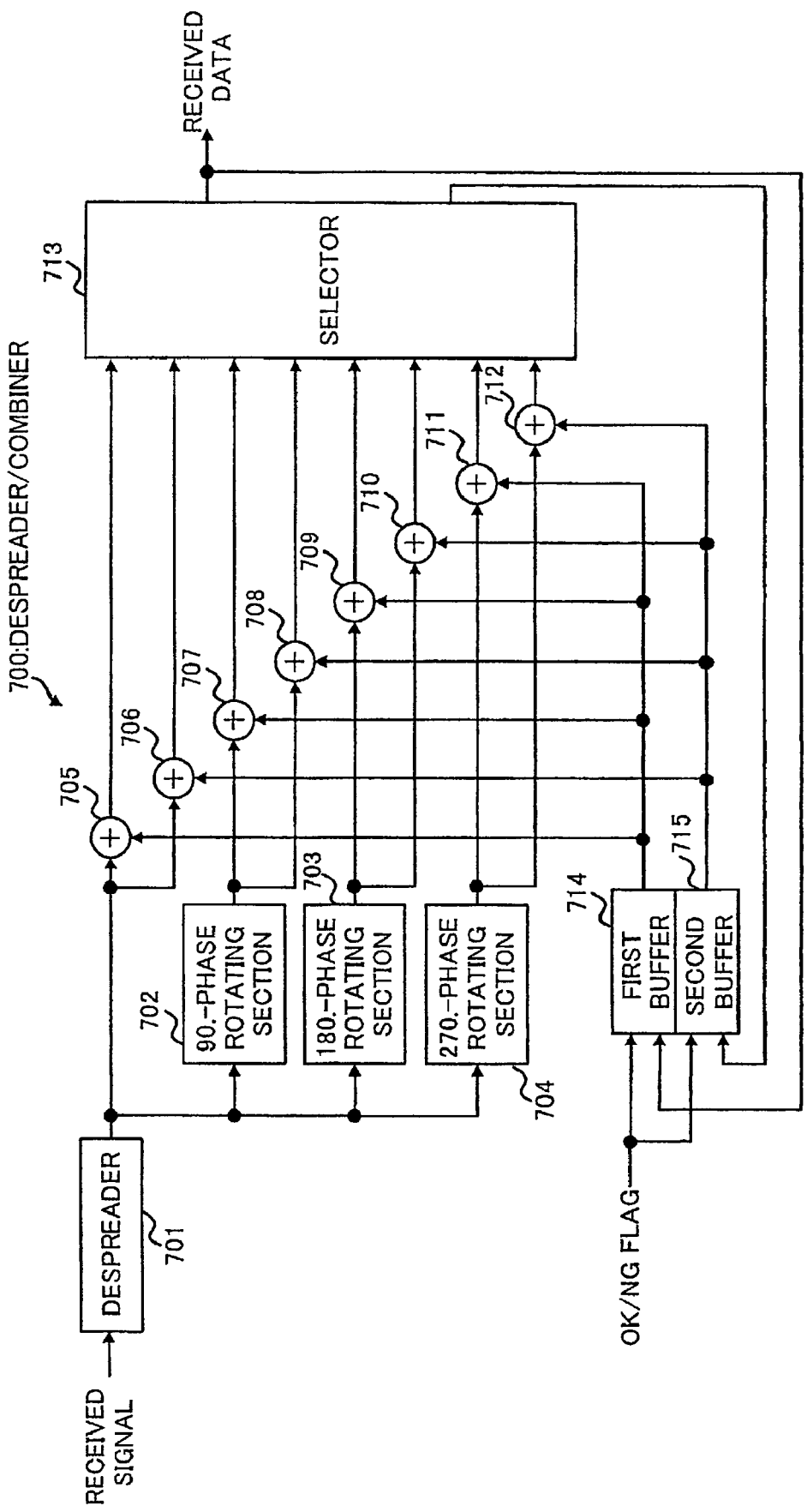
FIG. 9 is a block diagram illustrating the configuration of a despreader/combiner of each of a base station apparatus and a mobile station apparatus, which are data transmitting apparatuses according to Embodiment 7 of the present invention.

FIG. 9 is a block diagram illustrating the configuration of a despreader/combiner of each of a base station apparatus and a mobile station apparatus, which are data transmitting apparatuses according to Embodiment 7 of the present invention. A despreader/combiner 700 illustrated in FIG. 9 indicates the despreader/combiner explained in any of Embodiments 1 to 6.

The despreader/combiner 700 includes a despreader 701, a 90.-phase rotating section 702, a 180.-phase rotating section 703, a 270.-phase rotating section 704, and combiners 705 to 712, a selector 713, a first buffer 714, and a second buffer 715.

According to the above configuration, a received signals are despread by the despreader 701, and the despread signals are rotated at 90.-phase, 180.-phase, and 270.-phase by the 90.-phase rotating section 702, 180.-phase rotating section 703, and 270.-phase rotating section 704, respectively.

The rotated data and non-rotated data are combined with previous data held in the first buffer 714 and second buffer 715 by each of combiners 705 to 712, and the resultant is outputted to the selector 713.

The selector 713 selects data having the best quality and outputs it as received data, and stores it to the first buffer 110. Moreover, the selector 713 selects data having the second quality, and stores it to the second buffer 715.

Data held in each of the buffers 714 and 715 is reset at the time of inputting the OK flag.

Thus, according to the despreader/combiner of the data transmitting apparatus of Embodiment 7, received data subjected to despreading is rotated at appropriate phases and combined to make it possible to select received data having quality close to an optimal condition. Regarding the combination, amplitude other than the phases can be appropriately selected so that improvement of performance can be expected.

Though they increase hardware scale with an increase in the number of choices, performance is improved.

(Embodiment 8)

Figure 10:
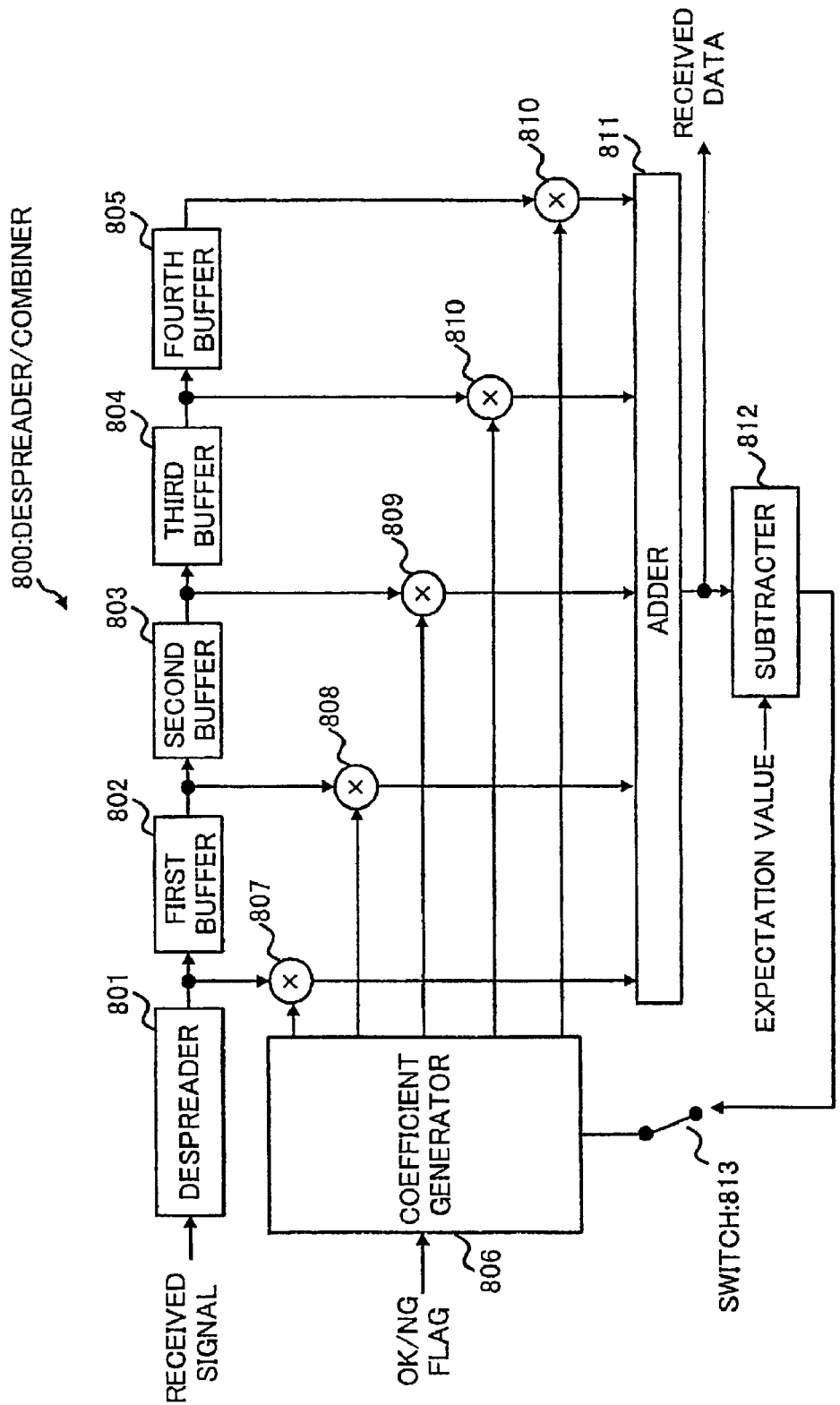
FIG. 10 is a block diagram illustrating the configuration of a despreader/combiner of each of a base station apparatus and a mobile station apparatus, which are data transmitting apparatuses according to Embodiment 8 of the present invention.

FIG. 10 is a block diagram illustrating the configuration of a despreader/combiner of each of a base station apparatus and a mobile station apparatus, which are data transmitting apparatuses according to Embodiment 8 of the present invention. A despreader/combiner 800 illustrated in FIG. 10 indicates the despreader/combiner explained in any of Embodiments 1 to 6.

The despreader/combiner 800 includes a despreader 801, first to fourth buffers 802 to 805, a coefficient generator 806, multipliers 807 to 810, 814, an adder 811, a subtracter 812, and a switch 813.

According to the above configuration, received signals are despread by the despreader 801, and the despread signals are held by the first to fourth buffers 802 to 805. This holding is performed in order of reception.

Each held data is multiplied by the coefficient sent from the coefficient generator 806 by each of the multipliers 807 to 810 and 814, and the multiplication results are added by the adder 811. Added data is outputted as received data, subtracted from an expectation value by the subtracter 812, and a difference therebetween is outputted to the coefficient generator 806 via the switch 813.

The coefficient generator 806 updates all coefficients again each time when a new retransmission signal comes. The past coefficients are unchanged, and only a new coefficient is optimized. In other words, the past coefficient uses the coefficient fixed in the past as an initial value and the new coefficient uses 0 as an initial value so that all coefficients are optimized again.

Thus, according to the despreader/combiner of the data transmitting apparatus of Embodiment 8, as a method for combining despread received data with held data, there is used a method in which all retransmitted signals are subjected to adaptive signal processing including LMS (Least Mean Square) using least square error as a guide principle, RLS (Recursive Least Squares), or GA (Generic Algorithm) to obtain an appropriate coefficient and to perform combination. Accordingly, it is possible to obtain received data having quality close to an optimal condition.

(Embodiment 9)

Figure 11:
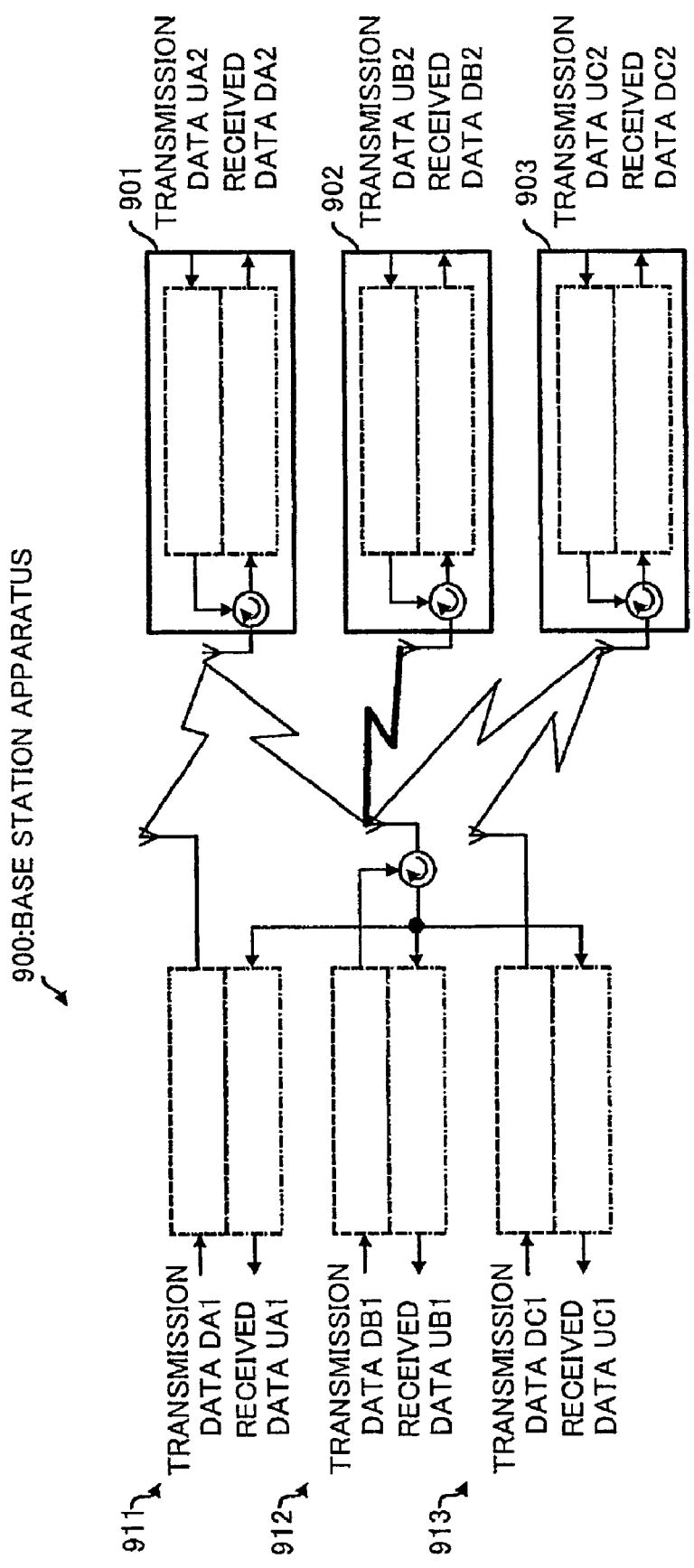
FIG. 11 is a block diagram illustrating the configuration of each of a base station apparatus and a mobile station apparatus, which are data transmitting apparatuses according to Embodiment 9 of the present invention.

FIG. 11 is a block diagram illustrating the configuration of each of a base station apparatus and a mobile station apparatus, which are data transmitting apparatuses according to Embodiment 9 of the present invention.

The mobile communication system illustrated in FIG. 11 is configured to have three users, namely, three mobile station apparatuses 901, 902, 903, a base station apparatus 900 equipped with transmission/reception sections 911, 912, 913 corresponding to the number of mobile stations 901, 902, 903, and antennas mounted thereon.

Each of the mobile station apparatuses 901, 902, 903 has the same configuration as that of the mobile station 101 of FIG. 2. Moreover, each of transmission/reception sections 911, 912, 913 provided in the base station 900 includes the buffer 110, format converter 111, spreader 112, modulator 113, variable gain amplifier 114, demodulator 115, despreader/combiner 116, and error detector 117, which are provided in the base station apparatus 100 of FIG. 2.

In other words, the base station apparatus 900 has transmission antennas, which are provided to the respective transmission/reception sections respectively, and performs communication with the mobile station apparatuses 901, 902, and 903.

Thus, according to the data transmitting apparatus of Embodiment 9, the number of transmission antennas of base station apparatus 900 is two or more, allowing independent fading among the mobile stations 901, 902, 903 particularly on the downlink, and this makes it possible to reduce interference.

Moreover, transmission antennas, which are more than the number of mobile station apparatuses, are provided to transmit data from a completely different antenna for each mobile station apparatus, and this further increases the effect.

(Embodiment 10)

Figure 12:
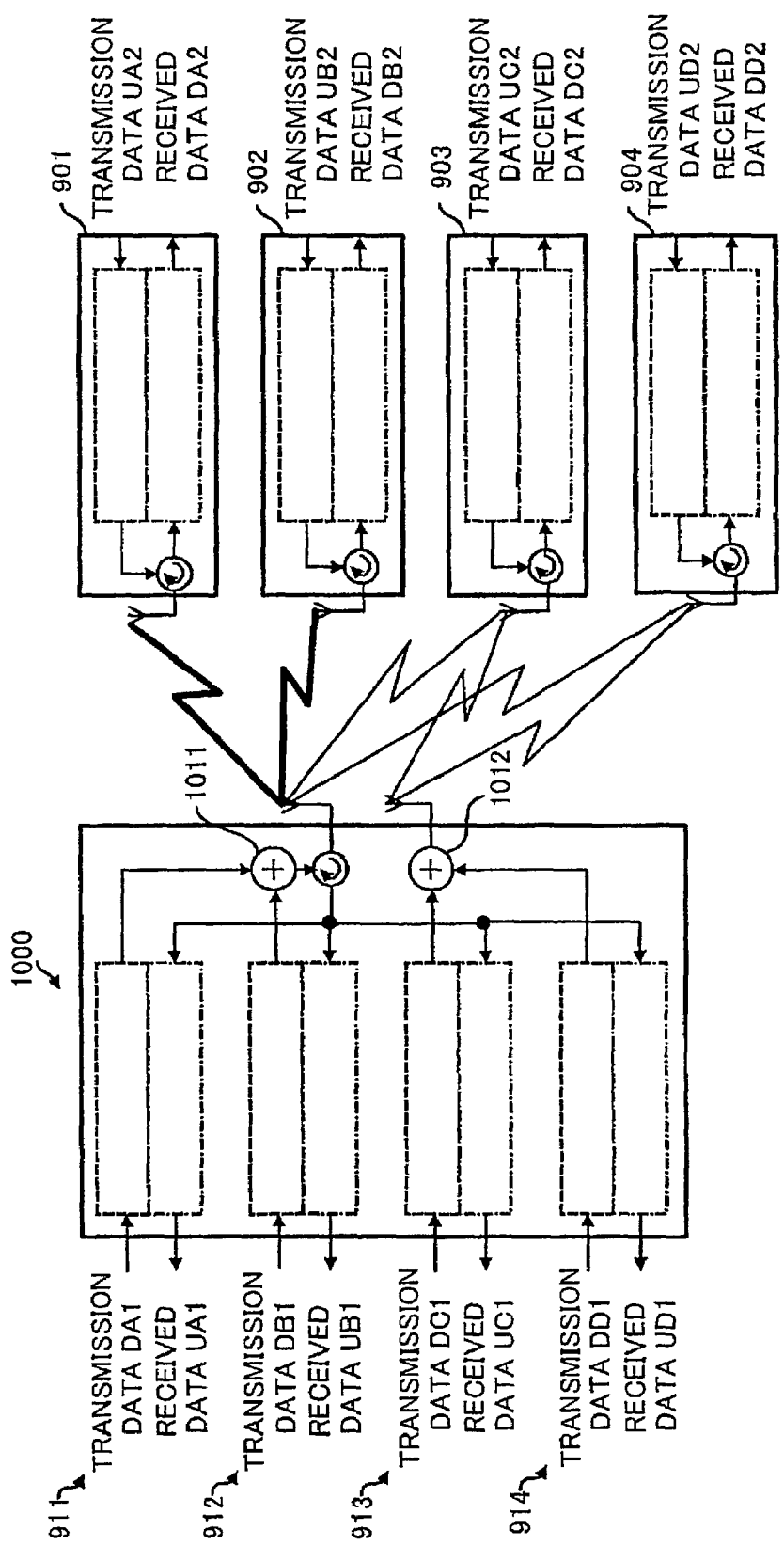
FIG. 12 is a block diagram illustrating the configuration of each of a base station apparatus and a mobile station apparatus, which are data transmitting apparatuses according to Embodiment 10 of the present invention.

FIG. 12 is a block diagram illustrating the configuration of each of a base station apparatus and a mobile station apparatus, which are data transmitting apparatuses according to Embodiment 10 of the present invention. In FIG. 12, the same reference numerals as FIG. 11 are added to the portions common to FIG. 11 and the explanation is omitted.

The difference between FIG. 12 and FIG. 11 lies in the points that combiners 1011 and 1012 are provided and specific users are grouped so that data is transmitted from a different antenna for each group.

For example, there are provided four users, namely, mobile station apparatuses having another mobile station apparatus 904 added to the mobile station apparatuses illustrated in FIG. 11. Then, the base station apparatus 1000 includes transmission/reception sections 911, 912, 913, 914 corresponding to the number of mobile stations 901, 902, 903, 904 and two antennas.

The combiner 1011 combines transmission data sent from the transmission/reception sections 911 and 912 and the combiner 1012 combines transmission data sent from the transmission/reception sections 913 and 914.

In this case, data is transmitted to two mobile station apparatuses 901 and 902 by one transmission antenna of the base station apparatus 1000 and data is transmitted to other two mobile station apparatuses 903 and 904 by the other transmission antenna.

Thus, according to the data transmitting apparatus of Embodiment 10, the specific mobile station apparatuses are grouped, so that data is transmitted from a different antenna for each group, allowing a reduction in interference particularly even in a case where it is difficult to prepare the transmission antennas, which is more than the number of users.

(Embodiment 11)

Figure 13:
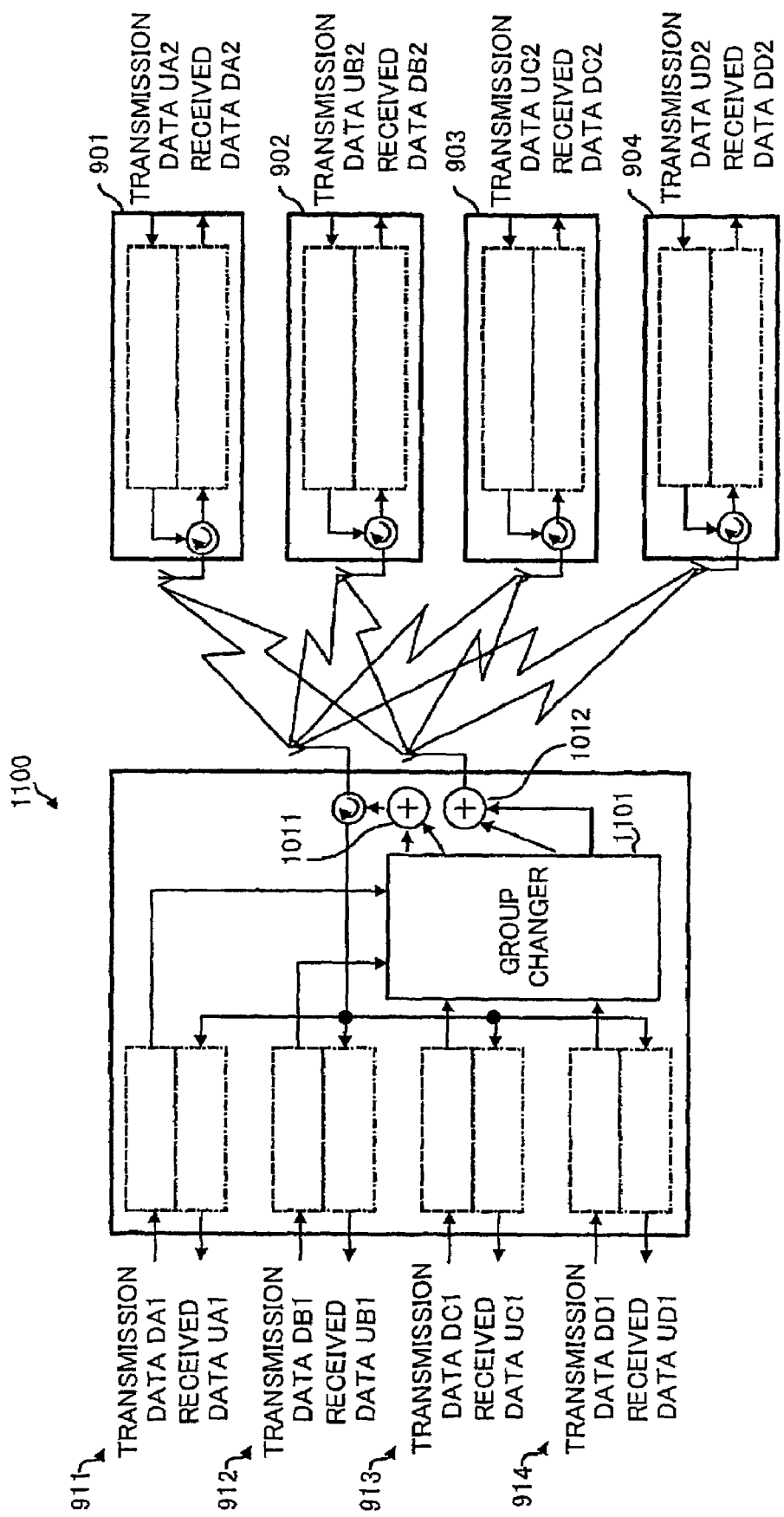
FIG. 13 is a block diagram illustrating the configuration of each of a base station apparatus and a mobile station apparatus, which are data transmitting apparatuses according to Embodiment 11 of the present invention.

FIG. 13 is a block diagram illustrating the configuration of each of a base station apparatus and a mobile station apparatus, which are data transmitting apparatus according to Embodiment 11 of the present invention. In FIG. 13, the same reference numerals as FIG. 11 are added to the portions common to FIG. 11 and the explanation is omitted.

The difference between FIG. 13 and FIG. 11 lies in the points that there is a base station 1100 equipped with a group changer 1101, which is connected between the output side of each transmission system and the antenna, by which the content of group is changed each time when data is retransmitted.

Thus, the data transmitting apparatus of Embodiment 11 can prevent the specific mobile station apparatuses from being always transmitted on the same line, thus reducing interference. Additionally, the content of group may be periodically changed instead of each retransmission time.

(Embodiment 12)

Figure 14:
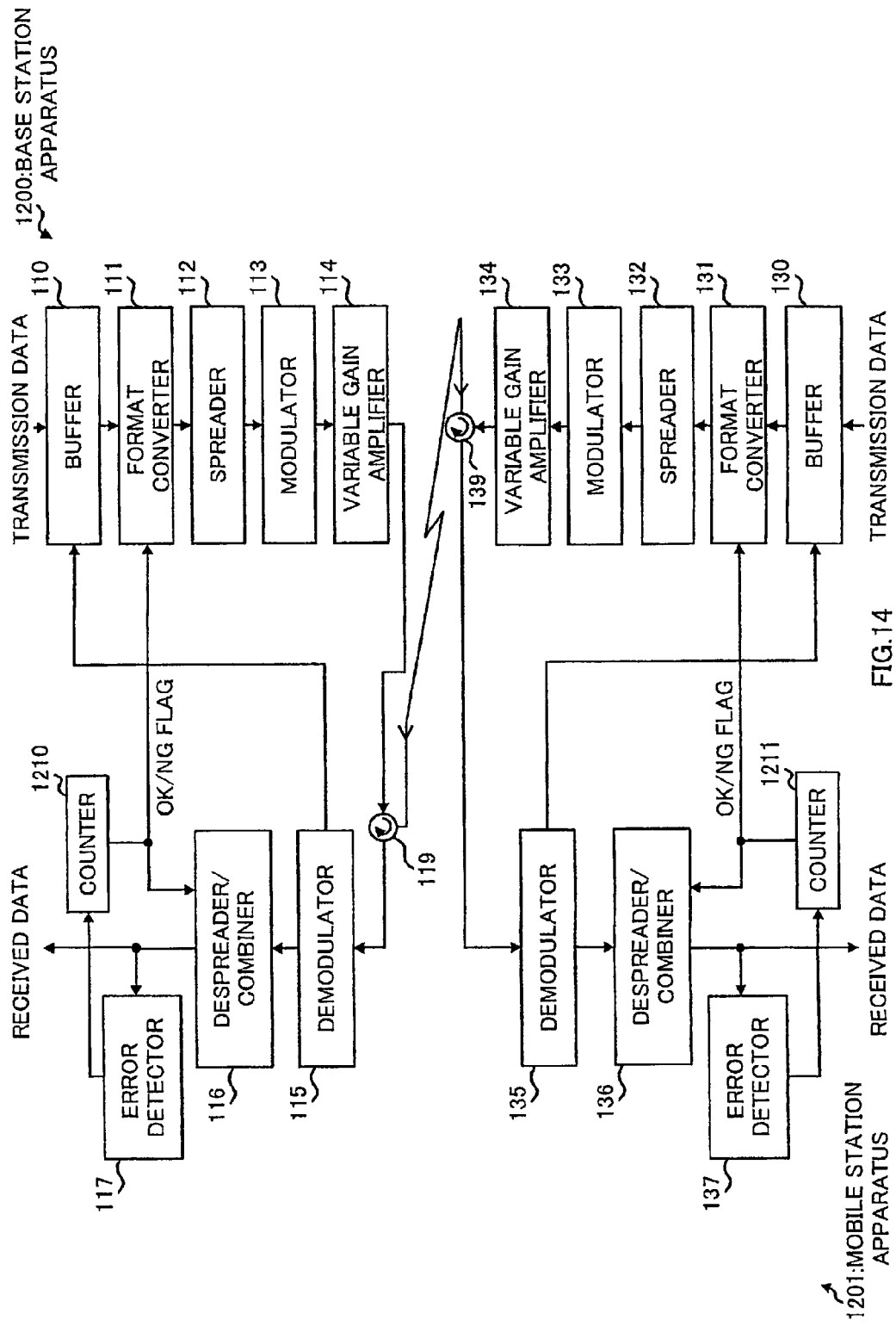
FIG. 14 is a block diagram illustrating the configuration of each of a base station apparatus and a mobile station apparatus, which are data transmitting apparatuses according to Embodiment 12 of the present invention.

FIG. 14 is a block diagram illustrating the configuration of each of a base station apparatus and a mobile station apparatus, which are data transmitting apparatus according to Embodiment 12 of the present invention. In FIG. 14, the same reference numerals as FIG. 2 are added to the portions common to FIG. 2 and the explanation is omitted.

The difference between FIG. 14 and FIG. 2 lies in the points that each of counters 1210 and 1211 is connected between the error detector 117 (or 137) and the format converter 111 (or 131) in each of a base station apparatus 1200 and a mobile station apparatus 1201.

The counter 1210 (or 1211) sets the number of times for restricting the transmission of NG flag and counts the number of transmissions times of NG flag, and stops the transmission of NG flag when the count reaches the set number of times.

If such restrictions are not provided, the signal of the line, which is little usable, continues to repeat its retransmission, long time interference with other mobile station apparatuses will occur. In such a case, processing such as disconnection of line will be executed.

Thus, the data transmitting apparatus of Embodiment 12 can provide the signal of the line, which is little usable, from continuing to repeat its retransmission. Moreover, it prevents occurrence of long time interference with other mobile station apparatuses.

(Embodiment 13)

Figure 15:
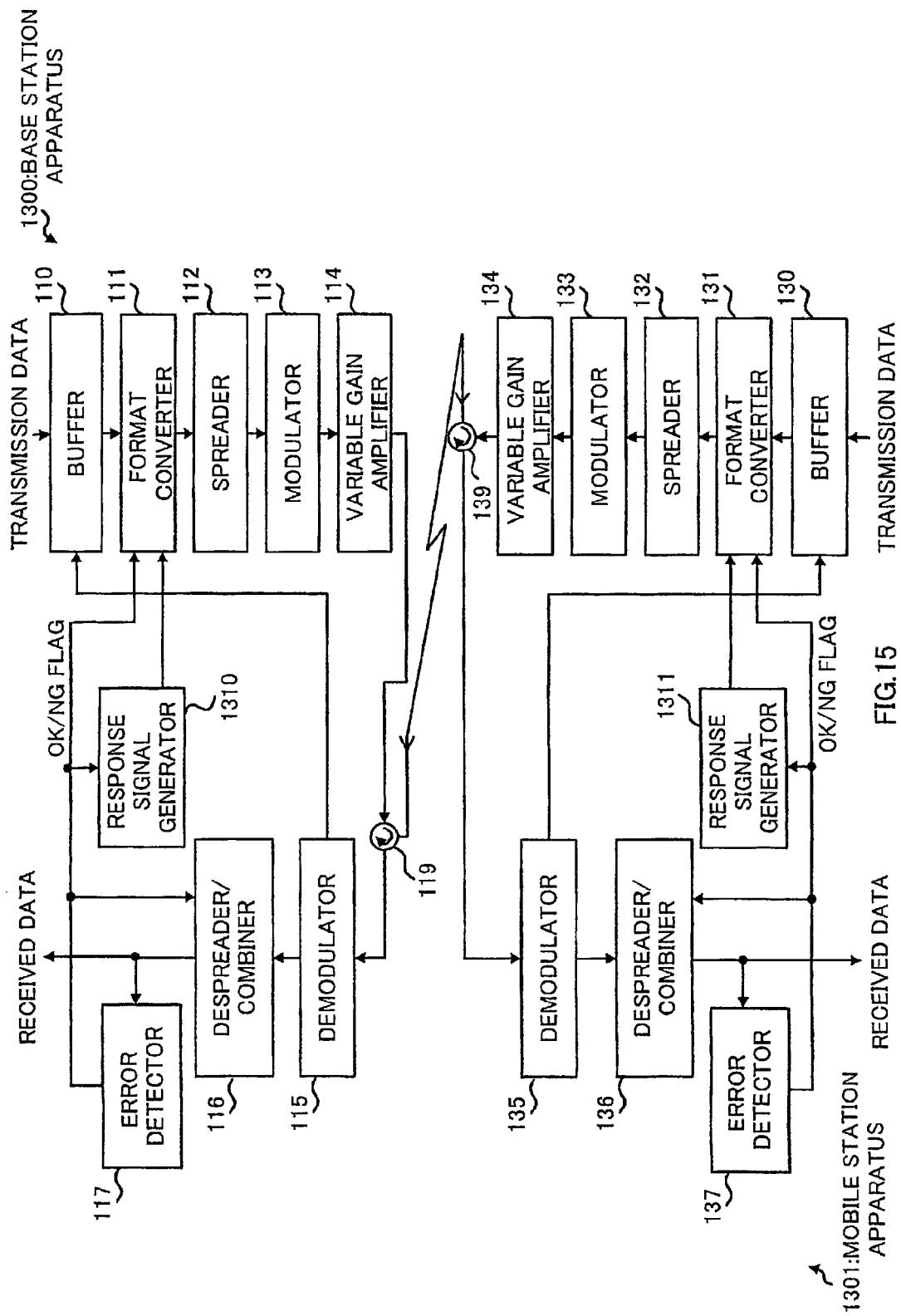
FIG. 15 is a block diagram illustrating the configuration of each of a base station apparatus and a mobile station apparatus, which are data transmitting apparatuses according to Embodiment 13 of the present invention.

FIG. 15 is a block diagram illustrating the configuration of each of a base station apparatus and a mobile station apparatus, which are data transmitting apparatuses according to Embodiment 13 of the present invention. In FIG. 15, the same reference numerals as FIG. 2 are added to the portions common to FIG. 2 and the explanation is omitted.

The difference between FIG. 15 and FIG. 2 lies in the points that each of response signal generators 1310 and 1311 is connected between the error detector 117 (or 137) and the format converter 111 (or 131) in each of a base station apparatus 1300 and a mobile station apparatus 1301.

When an OK flag or NG flag is received, the response signal generator 1310 (or 1311) sends a response signal, which indicates that the flag has been correctly received, to the sender of the flag.

Thus, the data transmitting apparatus of Embodiment 13 sends the reception response signal to the sender when receiving OK flag or NG flag. This eliminates the shift of control between transmission and reception caused, for example, when data retransmission, which should not be performed, is carried out, or data retransmission, which should be performed, is stopped, in the case where the flag is error.

As is obvious from the above explanation, the present invention can increase transmission efficiency, suppress transmission power extremely, and improve diversity performance in transmission from the plurality of antennas.

This application is based on the Japanese Patent Application No. 2000-072715 filed on Mar. 15, 2000, entire content of which is expressly incorporated by reference herein.

INDUSTRIAL APPLICABILITY

The present invention is suitable for use in a cellular phone in a mobile communication system to which a CDMA system is applied, a mobile station apparatus such as an information terminal apparatus having a cellular phone function and a computer function, and a base station that performs radio communication with the mobile station apparatus.

What is claimed is:

1. A data transmitting apparatus comprising:
    a holder that temporarily holds transmission data;
    a spreader that spreads the transmission data held by the holder at a low spreading factor at which a signal after despreading at a communication counterpart is unlikely to have a predetermined sufficient quality unless an extremely high quality line condition exists between the data transmitting apparatus and the communication counterpart; and
    a demodulator that causes the holder to hold the transmission data when a retransmission request is received from the communication counterpart and resets said transmission data held in the holder when no retransmission request is received from the communication counterpart.

2. The data transmitting apparatus according to claim 1, further comprising a channel changer that changes a channel, which is a data transmitting medium, at a retransmitting time due to error detection or periodically.

3. The data transmitting apparatus according to claim 1, wherein multi-carriers are used to transmit data.

4. The data transmitting apparatus according to claim 3, further comprising a frequency selector that arbitrarily selects a carrier frequency of transmission and reception data from the multi-carriers to set the selected carrier frequency.

5. The data transmitting apparatus according to claim 3, wherein spread data is converted into multi-carriers through OFDM.

6. The data transmitting apparatus according to claim 1, further comprising a plurality of transmission antennas wherein one transmission antenna is related to each communication counterpart to transmit data.

7. The data transmitting apparatus according to claim 6, wherein a plurality of communication counterparts are grouped and one transmission antenna is related to each group to transmit data.

8. The data transmitting apparatus according to claim 7, further comprising a group changer that changes a group to be related to the transmission antenna.

9. The data transmitting apparatus according to claim 1, further comprising a transmitter that transmits a response signal showing that a flag indicative of a result of an error detection has been correctly received, to a sender of the flag.

10. A mobile station apparatus having a data transmitting apparatus, the data transmitting apparatus comprising:
 a holder that temporarily holds transmission data;
 a spreader that spreads the transmission data held by the holder at a lower spreading rate at which a signal after despreading at a communication counterpart is unlikely to have a predetermined sufficient quality unless an extremely high quality line condition exists between the data transmitting apparatus and the communication counterpart; and
 a demodulator that causes the holder to hold the transmission data when a retransmission request is received from the communication counterpart and resets said transmission data held in the holder when no retransmission request is received from the communication counterpart.

11. A base station apparatus having a data transmitting apparatus, the data transmitting apparatus comprising:
 a holder that temporarily holds transmission data;
 a spreader that spreads the transmission data held by the holder at a lower spreading rate at a communication counterpart is unlikely to have a predetermined sufficient quality unless a high quality line condition exists between the data transmitting apparatus and the communication counterpart;
 a demodulator that causes the holder to hold the transmission data when a retransmission request is received from the communication counterpart and resets said transmission data held in the holder when no retransmission request is received from the communication counterpart.

12. A data transmitting method comprising:
 at a transmitting side, spreading transmission data at a low spreading factor at which a signal after despreading at a receiving side is unlikely to have a predetermined sufficient quality unless an extremely high quality line condition exists between the transmitting side and the receiving side;
 at the receiving side, despreading and holding received data and issuing a data retransmission request to the transmitting side when an error is detected in data obtained by combining the held data with retransmitted data subjected to despreading; and
 at the transmitting side, retransmitting the transmission data when receiving the retransmission request from the receiving side.

13. The data transmitting method according to claim 12, wherein the receiving side provides notification to the transmitting side only when received data becomes appropriate, and the transmitting side performs retransmission until receiving the appropriate notification.

14. The data transmitting method according to claim 12, wherein the transmitting side changes a channel, which is a data transmitting medium, from a previous channel at a time of retransmission.

15. The data transmitting method according to claim 12, wherein multi-carriers are used in transmitting and receiving data, and the transmitting side changes a channel for retransmitting data from a previous channel at a time of retransmission.

16. The data transmitting method according to claim 15, wherein conversion into multi-carriers is performed through OFDM.

17. The data transmitting method according to claim 12, wherein the number of data retransmission times is arbitrarily restricted.

18. The data transmitting method according to claim 12, wherein a fact that a flag, indicative of a result of an error detection, has been correctly received, is transmitted to a sender of the flag.

* * * * *